US00RE35834E

United States Patent [19]

Miller

[11] E Patent Number: Re. 35,834

[45] Reissued Date of Patent: Jul. 7, 1998

[54] ARTICLE WARMER WITH HEATED FRAME AND FLEXIBLE ENCLOSURE

[76] Inventor: William R. Miller, P.O. Box 8534, Erie, Pa. 16505

[21] Appl. No.: 771,013

[22] Filed: Dec. 20, 1996

Related U.S. Patent Documents

Reissue of:

[64] Patent No.: 5,548,100
Issued: Aug. 20, 1996
Appl. No.: 367,808
Filed: Dec. 30, 1994

[51] Int. Cl.[6] ..... F24H 1/06

[52] U.S. Cl. ..... 219/521; 392/486; 34/621; 219/385

[58] Field of Search ..... 219/385–386, 219/521; 34/235, 619, 621–622; 392/486; 223/51

[56] References Cited

U.S. PATENT DOCUMENTS

| | | | |
|---|---|---|---|
| 2,156,784 | 5/1939 | Jensen | 34/621 |
| 2,494,861 | 1/1950 | Chapman | 219/521 |
| 2,701,921 | 2/1955 | Strongson | 34/622 |
| 3,626,602 | 12/1971 | Glowacki | 34/622 |
| 3,660,013 | 5/1972 | Payet et al. | 223/51 |
| 3,835,552 | 9/1974 | Lord | 34/239 |
| 4,117,309 | 9/1978 | Cayley | 219/385 |
| 4,572,364 | 2/1986 | Jordan | 34/622 |
| 4,625,432 | 12/1986 | Baltes | 34/621 |
| 4,694,146 | 9/1987 | DeMars | 219/521 |
| 4,777,737 | 10/1988 | Wolens et al. | 34/619 |
| 5,152,077 | 10/1992 | Liang | 34/219 |
| 5,323,897 | 6/1994 | Sperber | 223/51 |

FOREIGN PATENT DOCUMENTS

| | | | |
|---|---|---|---|
| 360086 | 3/1990 | European Pat. Off. . | |
| 1283135 | 6/1962 | France . | |
| 227101 | 11/1943 | Switzerland | 219/521 |
| 515505 | 12/1939 | United Kingdom | 34/621 |
| 620228 | 3/1949 | United Kingdom | 219/521 |
| 692576 | 6/1953 | United Kingdom . | |
| 795463 | 5/1958 | United Kingdom | 219/385 |
| 851869 | 10/1960 | United Kingdom | 219/521 |
| 2212037 | 12/1989 | United Kingdom . | |

OTHER PUBLICATIONS

Towel Warmer, Advertisement from "Heartland America" Catalog, Heartland America, 6978 Shady Oak Rd., Eden Prarie MN 55344, Nov. 1994.

*Primary Examiner*—John A. Jeffery
*Attorney, Agent, or Firm*—Wall, Marjama & Bilinski

[57] ABSTRACT

A warmer and dryer for fabric articles having a vertically disposed heated frame upon which one or more articles can be draped. [A heated fluid is circulated through the frame by a pump that is mounted in the base of the frame.] The frame is enclosed by a flexible enclosure made from a material that retains heat while at the same time allowing moisture to pass therethrough into the surrounding ambient. Sufficient heat is provided to warm the atmosphere within the enclosure.

8 Claims, 2 Drawing Sheets

ARTICLE WARMER WITH HEATED FRAME AND FLEXIBLE ENCLOSURE

Matter enclosed in heavy brackets [ ] appears in the original patent but forms no part of this reissue specification; matter printed in italics indicates the additions made by reissue.

BACKGROUND OF THE INVENTION

This invention relates to an improved article warmer and, in particular, to a warmer for both heating towels and removing residual moisture from the towel fabric.

Many different towel warmers are presently available for use in bathrooms or the like. These devices generally take the form of a tubular frame upon which a towel to be warmed is hung or suspended. In practice, the frame is heated and thus only the inside section of the towel which is in direct contact with the frame is warmed. Towels and similar fabric articles are poor conductors of heat and thus, these heated frame devices do not provide a thorough warming of the towel. Cayley, in U.S. Pat. No. 4,117,309 describes a closed cabinet for warming towels. The towel is hung within the cabinet upon a U-shaped metal sheet. A heating element is contained within the U-shaped structure which heats the sheet by convection. Although Cayley provides for more uniform heating of the towel, the system consumes a good deal of energy. In addition, moisture driven from the towel remains captured in the cabinet atmosphere and is thus easily reabsorbed by the towel. As a consequence, a towel treated in the cabinet may be warmed, however, it can contain moisture which quickly cools once the towel is removed from the cabinet.

SUMMARY OF THE INVENTION

It is a primary object of the present invention to improve apparatus for warming articles such as towels, blankets and the like.

It is a further object of the present invention to remove moisture from an article as it is being warmed so that it is warmed to dryness.

Another object of the present invention is to provide a towel warmer that both warms a towel and removes moisture contained in the towel fabric.

A still further object of the present invention is to warm a fabric article or the like in a dry atmosphere.

These and many other objects of the present invention are attained by a drying apparatus that includes a base upon which is mounted a upright tubular frame upon which a fabric article such as a towel, blanket, or the like is draped. The frame is heated to a level sufficient to drive moisture from the towel. The frame is covered with a flexible bag or cosy that has the ability to hold heat while at the same time allowing moisture removed from the towel to pass through the bag fabric and into the surrounding ambient.

BRIEF DESCRIPTION OF THE DRAWINGS

For a better understanding of these and other object of the present invention reference will be made herein to the following detailed description of the invention which is to be read in association with the accompanying drawing wherein.

DESCRIPTION OF THE INVENTION

Figure 1:
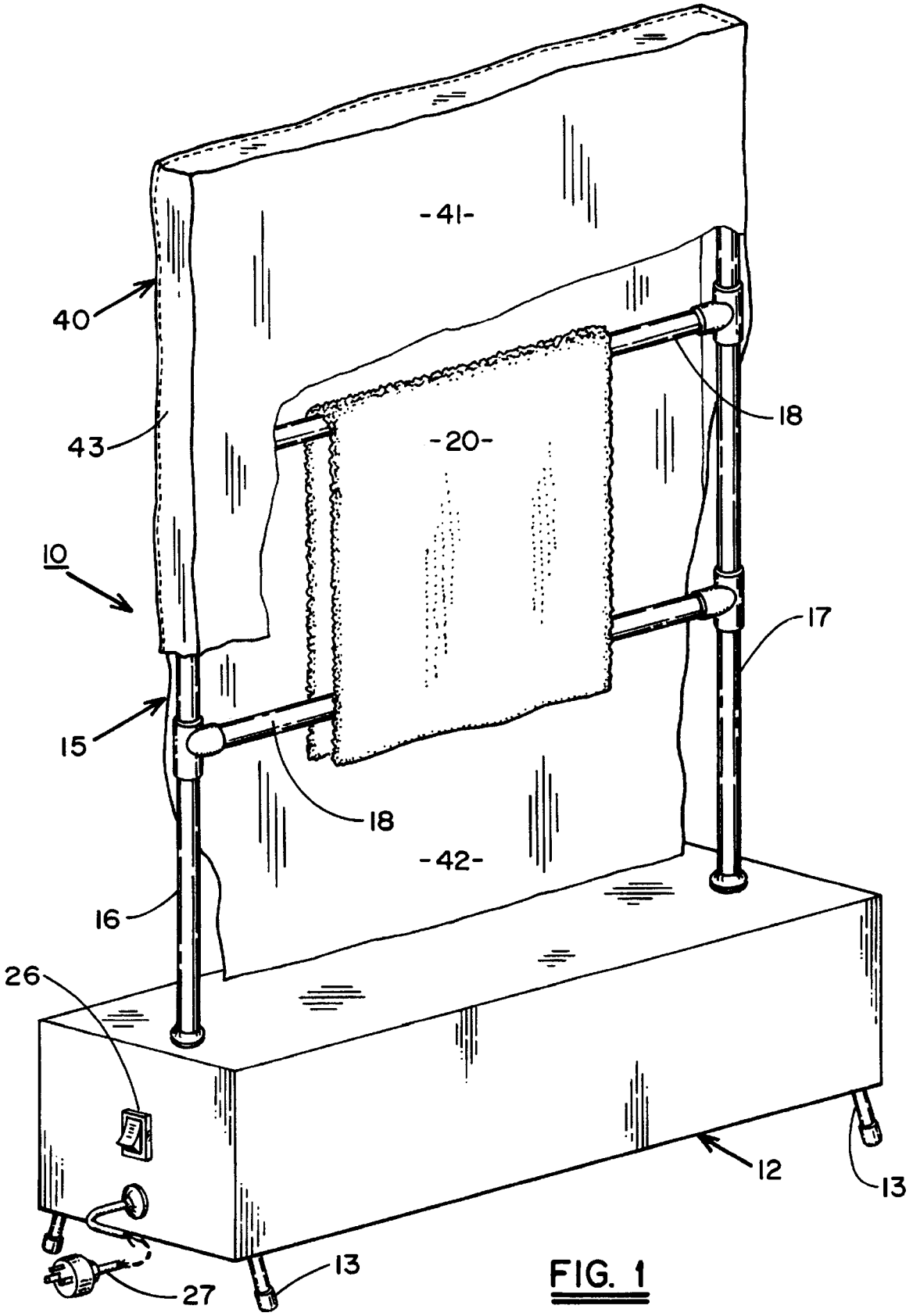
FIG. 1 is a perspective view with portions broken away illustrating the teachings of the present invention.

Referring initially to FIG. 1 there is shown a towel warming stand, generally referenced 10, embodying the teaching of the present invention. The stand includes a rectangular base 12 having legs 13—13 at the lower corners so that the base can be securely set upon the floor of a bathroom or the like. An upright frame 15 is secured in the base which is made up of a pair of vertical tubular risers 16 and 17 that are interconnected by means of a plurality of horizontal tubular members 18—18. The horizontal members of the frame serve as hangers over which towels such as towel 20 can be draped as shown.

Figure 2:
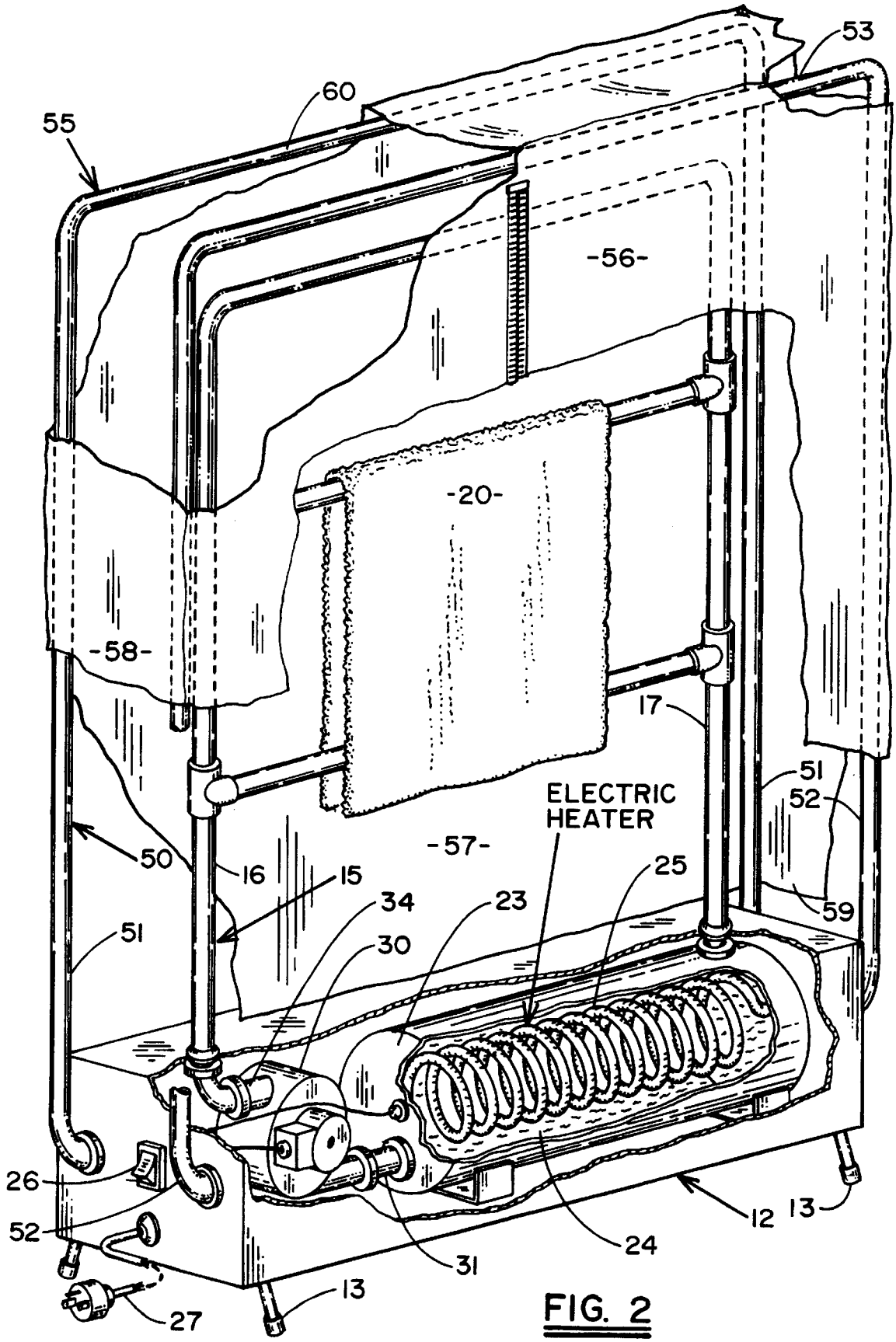
FIG. 2 is a second perspective view with portions broken away showing a further embodiment of the invention.

With further reference to FIG. 2, the base 12 houses a fluid reservoir 23 containing a quantity of oil 24 or similar type liquid having a relatively high coefficient of heat. Immersed in the reservoir is an electrical resistance heating element 25 that is connectable to a conventional electrical outlet through means of a switch 26 and electrical lead 27. An electrically driven pump 30 is coupled to the liquid reservoir by an inlet line 31. The discharge side of the pump is connected to riser 16 of the frame 15 via supply line 34. The pump is also connected to the switch so that closing the switch will simultaneously activate both the pump and the heating element. Alternatively, the oil may be simply circulated through the frame by convection.

With the switch closed, heated liquid will be circulated through the frame members and then returned to the reservoir via frame member 17. Heat is transferred from the flowing liquid via both conduction and convection to warm the frame members. As shown in FIG. 1, the entire frame 15 is housed within a bag or cosy-like enclosure 40. The enclosure is fabricated of a flexible material that is capable of retaining heat while at the same time allowing moisture within the enclosed atmosphere to pass freely to the surrounding ambient. An example of one such material is marketed under the tradename Thinsulate™ (by 3M) which is used widely in the manufacture of winter garments.

The bag-like enclosure 40 contains a front panel 41 and a back panel 42 that are cojoined by a gusset 43 that extends around the two sides and top of the enclosure. The bottom of the bag is open so that it can be easily placed over the frame to entirely enclose the frame and any towels or the like that might be draped over the frame. Oftentimes the towels placed upon the frame contain a moisture from previous use or laundering, and, as explained above, will normally be warmed to dryness in those areas contacting the heated frame members.

Sufficient heat is transferred from the frame to heat both the towel and the atmosphere trapped within the bag. Moisture driven from the towel during the warming process is passed to the trapped atmosphere and then through the bag material under natural flow conditions to the surrounding ambient. Accordingly, the atmosphere within the bag is maintained in a condition to facilitate the warming of the entire area of a towel mounted on the rack to dryness.

As illustrated in FIG. 2 a second outer frame generally referenced 50 is mounted upon the base 12. The outer frame contains two pairs of vertical supports 51 and 52 mounted in the opposed end walls of the base. The vertical supports are joined by a pair of horizontally disposed top members 53. The outer frame defines a rectangular box in which the inner heating frame 15 is located. An enclosure 55 is supported on the outer frame which again is fabricated of a flexible material that will retain heat but allow moisture to readily pass therethrough. The enclosure includes opposed side panels 56 and 57, opposed by panels 58 and 59 and top panel 60.

The enclosure 55 is arranged to pass over the support frame 50 as shown, to completely enclose the heating frame 15 therein. The front panel 56 of the enclosure is provided with a vertically extended zipper 61 that allows the enclosure to be opened and closed without having to remove it from the supporting frame. As can be seen, this double frame arrangement provides for additional space within the bag for warming bulky articles such as blankets or the like.

Here again, sufficient heat is transferred from the frame 15 to a towel or towels mounted thereon to both warm and dry the towels. At the same time, a warm dry atmosphere is established within the enclosure which helps in the conditioning of the towels and maintains the towels in the desired warm dry condition until they are removed from the enclosure.

While this invention has been explained with reference to the structure disclosed herein, it is not confined to the details set forth and this application is intended to cover any modifications and changes as may come within the scope of the following claims:

What is claimed is:

1. Apparatus for warming articles that includes a base supporting a tubular warming frame having interconnected members whereby a fluid can be circulated through the frame, a flaccid bag passing over said frame to enclose said frame and an article to be warmed hanging upon said frame, said bag being constructed of a material adapted to retain heat while at the same time allowing moisture to pass freely therethrough whereby a warm dry atmosphere can be maintained within said bag, and pumping means adapted to circulate a heated fluid through said frame to heat both an article hung upon said frame and the air contained inside the bag to maintain a warm dry atmosphere within the bag.

2. The apparatus of claim 1 wherein said bag contains a vertically disposed fastening means for selectively opening and closing said bag whereby articles can be passed in and out of said bag without removing the bag from said warming frame.

3. The apparatus of claim 1 that further includes a heater means mounted in said base for heating the fluid that is circulated through said warming frame.

4. The apparatus of claim 1 that further includes a second support frame mounted in said base upon which the bag is supported out of contact with said warming frame.

*5. Apparatus for warming fabric articles, said apparatus having a base supporting a tubular warming frame and a means for circulating a heated fluid through said frame, the improvement comprising:*

*a flaccid bag passing over said frame to enclose said frame and an article to be warmed hanging upon said frame, said bag being constructed of a material adapted to retain heat while at the same time allowing moisture to pass freely therethrough whereby a warm dry atmosphere is maintained within said bag.*

*6. The apparatus of claim 5 wherein said baa contains a vertically disposed fastening means for selectively opening and closing said bag whereby articles can be passed in and out of said bag without removing the bag from said warming frame.*

*7. The apparatus of claim 5 that further includes a heater means mounted in said base for heating the fluid that is circulated through said warming frame.*

*8. The apparatus of claim 5 that further includes a second support frame mounted in said base upon which the bag is supported out of contact with said warming frame.*

* * * * *

UNITED STATES PATENT AND TRADEMARK OFFICE

CERTIFICATE OF CORRECTION

PATENT NO. : Re. 35,834

DATED : July 7, 1998

INVENTOR(S) : William R. Miller

It is certified that error appears in the above-identified patent and that said Letters Patent is hereby corrected as shown below:

Col. 4, Line 24, please delete the second "a" in the word baa and please insert --g--.

Signed and Sealed this

Twenty-fourth Day of November, 1998

*Attest:*

Bruce Lehman

BRUCE LEHMAN

*Attesting Officer*

*Commissioner of Patents and Trademarks*